(12) United States Patent
Hall, IV et al.

(10) Patent No.: US 7,996,575 B2
(45) Date of Patent: Aug. 9, 2011

(54) DETECTION AND CONFIGURATION OF SAS/SATA CONNECTION

(75) Inventors: Calvin Springer Hall, IV, Costa Mesa, CA (US); David Alexander Neufeld, Costa Mesa, CA (US); Hugh Le, Costa Mesa, CA (US); Brett Talmadge White, Costa Mesa, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 182 days.

(21) Appl. No.: 11/966,915

(22) Filed: Dec. 28, 2007

(65) Prior Publication Data

US 2009/0172206 A1 Jul. 2, 2009

(51) Int. Cl.
*G06F 3/00* (2006.01)
*G06F 13/00* (2006.01)

(52) U.S. Cl. ............... 710/8; 307/127; 710/10; 710/14; 710/15; 710/100

(58) Field of Classification Search .............. 307/112, 307/116, 125, 127; 710/1, 8, 10–12, 14, 710/15, 16, 100, 104–125, 300–317
See application file for complete search history.

(56) References Cited

U.S. PATENT DOCUMENTS

| | | | | |
|---|---|---|---|---|
| 6,661,805 B1 * | 12/2003 | Romano et al. | ............... | 370/450 |
| 2006/0242312 A1 * | 10/2006 | Crespi et al. | ............... | 709/230 |
| 2009/0030649 A1 * | 1/2009 | Cagno et al. | ............... | 702/158 |
| 2009/0083423 A1 * | 3/2009 | Basham et al. | ............... | 709/226 |
| 2009/0172206 A1 * | 7/2009 | Hall et al. | ............... | 710/10 |

OTHER PUBLICATIONS

54150/DM54150/DM74150, 54151A/DM54151A/DM74151A Data Selectors/Multiplexers; Jun. 1989; National Semiconductor Corporation; pp. 1-10.*

* cited by examiner

*Primary Examiner* — Alford W Kindred
*Assistant Examiner* — Richard B Franklin
(74) *Attorney, Agent, or Firm* — Morrison & Foerster LLP (57) ABSTRACT

Given the different configurations for SAS and SATA Host and Target Ports, embodiments of the present invention automatically detect the configuration of SATA and SAS Phys when any device is inserted into a port enclosure and properly configure the connection regardless of the Phy configuration of the connected device. When a device is connected to the system, the port listens for either a SATA or SAS OOB signal to determine if the receive pin of the port is properly connected to the transmit signal of the attached device. By switching the configuration periodically and listening for the OOB signal, the port can determine which configuration is proper. Once a signal is detected, the port can properly configure the connection and continue with the SATA or SAS insertion algorithm. A user may alternatively choose which configuration to use and bypass the automatic detection and configuration.

33 Claims, 7 Drawing Sheets

DETECTION AND CONFIGURATION OF SAS/SATA CONNECTION

FIELD OF THE INVENTION

This invention relates to the ability to connect a host to various Serial Attached Small Computer System Interface (SAS) expanders, and Serial Advanced Technology Attachment (SATA) devices without regard to the physical layer (Phy) configuration.

BACKGROUND OF THE INVENTION

SAS and SATA are computer bus technologies primarily designed for transferring data to and from devices, such as a computer and a storage device. A SAS initiator generally is a task manager of other, target, devices connected to the system. The target device receives task management requests from the initiator and sends responses to those requests. SAS and SATA protocols were originally designed for Host to Target connections. SAS currently uses the same physical layers (Phy) as SATA with the assumption that all cables are straight. These devices connect through "Host" and "Target" Phy, where the Target Phy is wired backwards from the Host Phy. Therefore, the Host Phy transmit pin aligns with the Target Phy receiver pin, and the Host Phy receive pin aligns with the Target Phy transmit pin. When referring to SAS devices or protocols, it is intended to include SAS and SATA devices, protocols, and configurations.

These systems expanded to backend setups adding analyzers and expanders between the Host and Target device. When adding these other devices into a system, users end up with a Host Phy (such as an HBA) needing to connect to another Host Phy (such as an expander or analyzer). These configurations require a crossover cable as the direct connection would connect the transmit pins from both the Hosts together. Cascading between expanders also requires crossover cables unless some ports are configured to be upstream and others are configured to be downstream.

A SAS expander can generally be described as a switch that allows initiators and targets to communicate with each other in a network, and allows additional initiators and targets to be added to the network. A SAS expander is added to the host system through the host bus adapter (HBA), which connects the host to other network and storage devices. The SAS-2 protocol, the specification of which is currently available in draft form (Revision 12, Sep. 28, 2007) at www.t10.org and identified as T10/1760-D or Reference Number ISO/IEC 14776-152:200x, the contents of which are incorporated by reference herein, supports networks including cascades and trees (as well as trees of cascades) of SAS expanders. Typically, a cascade utilizes a single wide-port (containing multiple Phys) for connecting the expanders together with multiple physical connections.

Given the unique port configurations for the Host and Target devices, special cables are used to properly connect the system devices together. Cables can be expensive, and the designer of a system must know whether the devices are Host or Target to ensure that they are properly connected. Another problem arises in identifying the type of cable; the straight and cross-over cables appear exactly the same. Therefore, the technician must know the configuration of the devices, and must keep track of which cables are straight and crossed-over.

Figure 1:
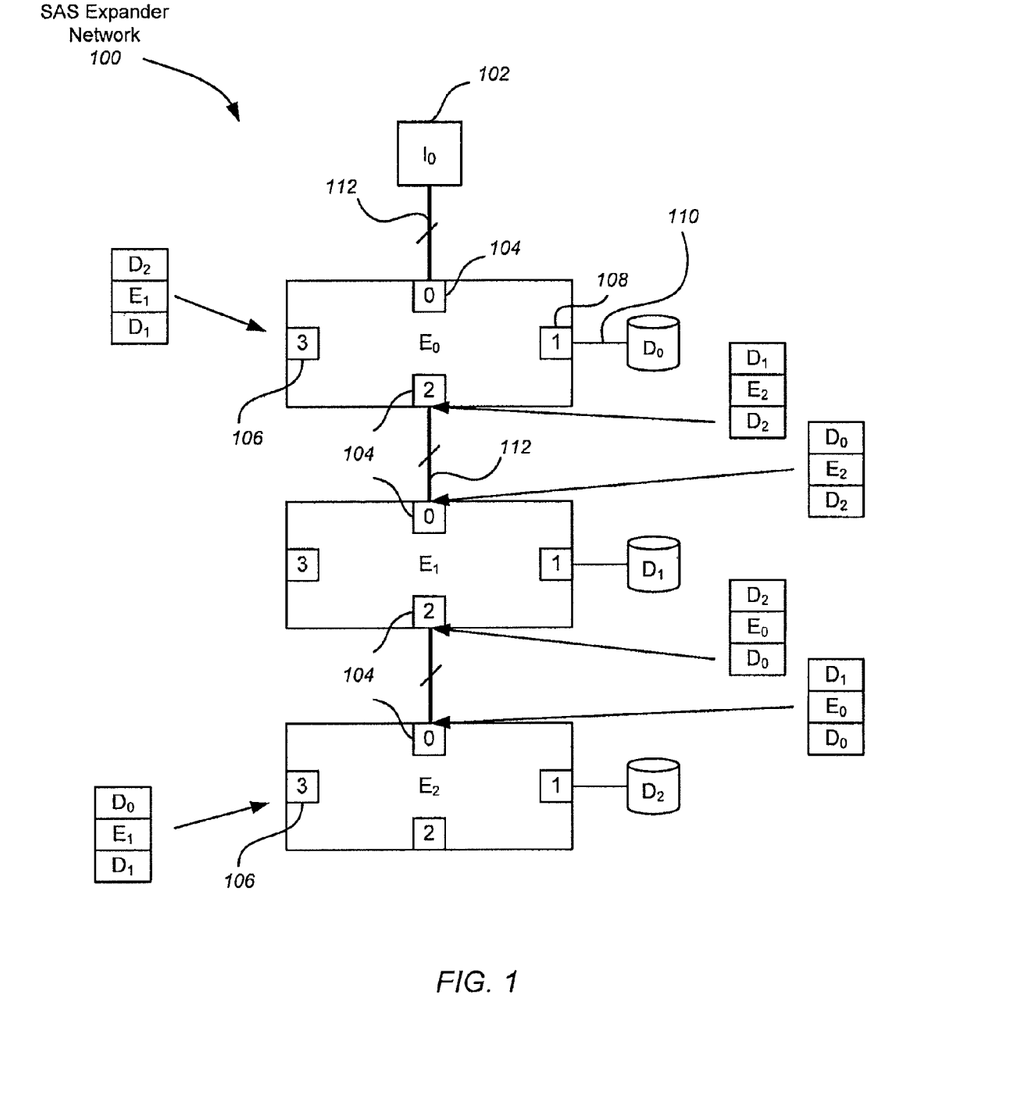
FIG. 1 illustrates an exemplary conventional SAS expander network.

FIG. 1 illustrates an exemplary conventional SAS expander network 100. FIG. 1 shows an initiator ($I_0$) 102 connected via multiple lines to a cascade of SAS expanders, E0, E1 and E2 through ports 104 on each expander. Attached to each SAS expander may be one or more SAS or SATA drives D0, D1 and D2 through port 106 or 108. The initiator 102 and SAS expanders E0, E1, and E2 are Hosts, while the SAS or SATA drives D0, D1, and D2 are Target devices. When one of the expanders is connected to a drive, a conventional straight cable is used, as the transmit and receive lines of these devices are properly paired. However, when two Host devices are connected, such as the initiator to an expander or an expander to another expander, a crossover cable is required. If the initiator is connected to an expander with a straight cable, the transmit lines of both devices would be connected together, which would violate protocol and potentially harm one of the devices.

The current system presents problems for system designers. When creating a new system, the system designer must carefully plan the required expanders and drives and ensure the configurations are connected properly. A designer must specify the Phy configurations of their system when designing the system. Generally, a designer will designate a number of Phys as Target and another number as Host Phys. Therefore, when a specific Phy is required in the future, there is an available location for whatever device is needed. However, this requires extra space within the system, extra parts, and leaves ports unused, as they are specifically dedicated to a certain type of device. Adding to this problem when additional ports are not available, altering a system by changing the connection between a Host to a Target would require a changing the port, which requires rewiring the Phys, or changing the cables. However, all these alternatives are expensive and time consuming.

Another problem can arise from simple human error. When a technician makes the proper connection between the various system devices, the proper cables must be used. Since the straight and crossover cables appear exactly the same, it is easy for a technician to inadvertently connect two devices with the wrong cable. First, the system would not work properly, and the technician would have to spend time trouble shooting the set up to find the improper connection. Using an improper cable would also violate protocol and connect two transmit lines together from opposing devices. This could potentially harm these devices as the transmit lines were not intended to receive an input. At a minimum, the improper connection would prevent the device or system from working properly.

Finally, in Fibre Channel (EC), all cables are assumed to be crossover cables, all ports are simply "device" ports, and no special cables are ever needed for normal configuration. Migrating to SAS, where there are different kinds of cables and different kinds of ports, can be a barrier to consumers.

SUMMARY OF THE INVENTION

Ports in SAS expanders are generally configured as Host or Target Phys. Given the unique port configurations for Host and Target devices, special cables are generally required to properly connect the system devices together. Embodiments of the present invention automatically detect the configuration of SATA and SAS Phys (either Target or Host) upon inserting any device into a port enclosure and properly configure the connection regardless of the Phy configuration of the connected device.

When a device is connected to the system, the SAS expander Phy starts in a Regular Host Phy Idle Mode. The Phy is configured in a regular state, compliant with SAS or SATA protocol. The port then detects either a SATA or SAS OOB signal from the attached device. If a signal is detected, then the system continues with the insertion algorithm, as everything is connected properly. However, if a signal is not detected, the Phy enters a Passive Crossover Listen Mode. In this Mode, the receive line is reconnected in a crossover configuration. The SAS expander port, in the Passive Crossover Listen Mode, also stops transmitting a transmit signal. The Phy then continues to listen for an OOB signal from the other device. If a signal is detected, the port enters an Active Crossover Mode. The Phy permits the transmit signal to be sent out of the transmit pin, also in a crossover configuration. However, if a signal is not detected again, then the configuration is switched back to a straight configuration and starts again.

Once the detection logic is completed and the pin configuration is determined, the system proceeds with the insertion algorithm. Whether the configuration is straight or crossed over does not matter to the system. Once the system determines that the pins are properly connected, the system proceeds with specification compliance, where the SAS or SATA protocols determine the connection speed and other factors for the devices to properly communicate.

Embodiments of the present invention additionally permit the connection to skip the detection step and directly configure the Phy for a straight across connection or a crossover connection. Therefore, if the device configuration is known, the system may be directly configured and bypass the automatic configuration. The switch rate or lapse time the port spends in each Mode listening for an OOB signal may also be programmed through registers within the ASIC.

As an exemplary embodiment of the circuitry to accomplish the switching logic, the input and output pins of a SERDES are converted to bi-direction pads in order to permit the crossover of the signals. A multiplexer and demultiplexer are additionally controlled by the logic of an ASIC to determine the connections from the SERDES to the bi-directional pads.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the preferred embodiments of the present invention. In addition, methods described in a particular order may be performed in various sequences without departing from the scope of the present invention. It is also understood that the described steps of a particular method may be combined, expanded, removed, or altered to accomplish the same result are still within the embodiments of the present invention.

Given the different Phy configurations of SATA and SAS devices, Host and Target devices may be properly connected in various combinations if properly connected using appropriate straight or crossover cables. Embodiments of the present invention automatically detect the configuration of SATA and SAS Phys (either Target or Host) upon inserting any device into a port enclosure and properly configure the connection regardless of which cable (straight or crossover) is utilized. The detection scheme according to embodiments of the present invention listens for a known SATA or SAS Out Of Band (OOB) sequence to determine which side of the port is transmitting. Once a signal is detected, the Phy is then properly connected to communicate with the connected device without ever visibly violating the SATA or SAS protocols. Therefore, the designation of Target and Host Phy and the need for specific crossover or straight cables becomes irrelevant.

Some embodiments of the present invention are directed to switching the receive side of the port back and forth between the two sides of the port to detect a signal. These embodiments of the invention permit any device to be connected to any port on a system with any cable. Any Phy could effectively be ready as either a Target Phy or a Host Phy. Embodiments of the invention assist in system design and configuration for the full range of implementation possibilities (box product, IOC, blade enclosures, etc.). Embodiments of the invention also assist in trouble shooting a system if the devices are accidentally connected backwards. Some embodiments of the present invention will determine that the transmitted signal is not connected to the proper port pin and switch the connection.

Embodiments of the present invention additionally permit the connection to skip the detection step and directly configure the Phy for a straight across connection or a crossover connection. Therefore, if the device configuration is known, the system may be directly configured and bypass the automatic configuration.

The automatic Phy detection and configuration of the present invention provides advantageous features at all levels of integration, from the individual Phy to the entire SAN, because either a Host or Target device can be inserted and utilized within an enclosure and SAN, without a need for properly configuring the Phy or using the appropriate cable. Although embodiments of the invention may be described herein primarily in terms of SAS and SATA devices, it should be understood that embodiments of the invention are not so limited, but extend to other compatible devices. Details of the embodiments of the present invention are also generally discussed in terms of a SATA OOB signal detection, however, it should be understood that embodiments of the present invention are not so limited and may be extended to SAS OOB signal detection.

Figure 2:
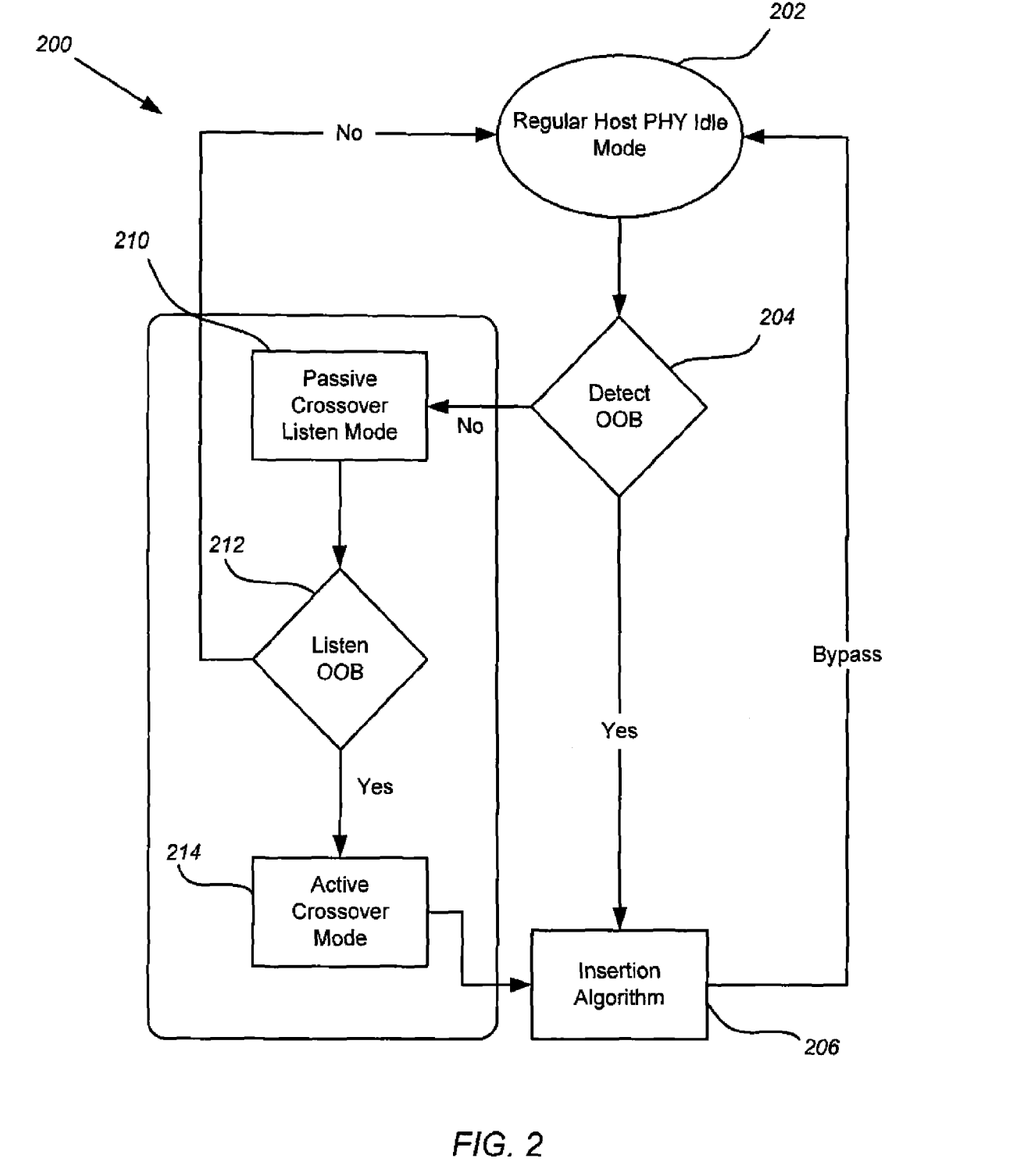
FIG. 2 illustrates one embodiment of the flow logic to automatically detect the Phy configuration of an attached device.

FIG. 2 illustrates one embodiment of the flow logic 200 to automatically detect the Phy configuration of an attached device. The Phy starts in a Regular Host Phy Idle Mode. At bubble 202, the Phy is configured in a regular state, compliant with SAS or SATA. The connection should connect a receive line of a Host port to the transmit line of a Target device. Next, block 204, the port listens for the OOB signal of the attached device. Descriptions of SATA OOB sequences are described fully in the standards documentation and also in "Serial SATA Storage Architecture and Applications" by Knut Grimsrud and Hubbert Smith, Intel Press 2003, the contents of which are incorporated by reference herein. The system may, alternatively, listen for a SAS OOB signal. Descriptions of the SAS OOB protocol is described fully in standards documentation and also in "SAS Storage Architecture" by Mike Jackson, MindShare Press 2005, the contents of which are incorporated by reference herein. If a signal is detected on the receive line, then the logic proceeds to block 206. Since the system is already connected in the Regular Host Phy configuration, and a signal has been received, the system continues with the insertion algorithm. Everything is connected properly.

If a signal is not detected, however, the Phy enters into a Passive Crossover Listen Mode, depicted as block 210. In the Passive Crossover Listen Mode, block 210, the receive line is reconnect to the other pin of the attached device. Therefore, the receive line is connected in a crossover configuration. Since a signal was not received in the regular configuration, it is likely that either no device is connected to the port, or the connection is incorrect. If the connection is backwards, then a transmit signal is sent to another transmit pin. Therefore, the system in the Passive Crossover Listen Mode stops the device from transmitting. The Phy then continues to listen for an OOB signal from the other device, in block 212. If a signal is detected, the logic proceeds to block 214 and enters an Active Crossover Mode. Currently, the receive pin of the port is connected in a crossover configuration. The Phy then permits the transmit signal to be sent out of the transmit pin, also in the crossover configuration. However, if a signal is not detected, then the receive pin is switched back to a straight configuration and starts again at block 202.

Once the detection logic is completed and the pin configuration is determined, the system proceeds with the insertion algorithm, block 206. The pins are then properly connected: the receive with the transmit of the attached device, and the transmit with the receive of the attached device. Whether the configuration is straight or crossed over does not matter to the system. Once the system determines that the pins are properly connected, the system proceeds with specification compliance, where the SAS or SATA protocols determine the connection speed and other factors for the devices to properly communicate. In one embodiment, the system would not reenter the detection and configuration mode again until a physical disconnect occurs within the system. Therefore, whenever a device is physically disconnected from the system, the system would ensure that the newly inserted device is properly connected. As long as the device stays physically connected to the system, there is no longer a need to configure the connection. In another embodiment, the detection and configuration mode may be forced at anytime through an insertion state when there is a forced OOB signal present.

In steps 204, the Phy is listening for an OOB signal to determine that the receive line is connected to the transmit line of the attached device. The Phy switches between the Regular Host PHY Idle Mode into the Passive Crossover Listen Mode after a period of time if a signal is not detected. The time the Phy waits for a signal may be preset within the logic, or may be a parameter by a user to configure the system. For example, a user may enter a switch rate or time lapse by programming the registers in control of the switching logic before connecting a device to the system.

In an alternate embodiment, the logic may be programmed to start at various locations along the logic path. For example, the system may be programmed to start in the Passive Crossover Listen Mode as opposed to the Regular Host PHY Idle Mode. In this embodiment, a user may guess which configuration is a needed, but still benefit from the backup protection of the system correcting any potential error in the connection. Therefore, if a user wishes to connect two host ports, the Phy can be configured to start in the Passive Crossover Listen Mode, and the connection is properly made once an OOB signal is detected. However, if the user erred in choosing the proper connection, the system would not detect an OOB signal and then enters the Regular Host PHY Idle Mode.

A user may additionally choose to bypass the Passive Crossover Listen Mode completely, even if an OOB is not detected. In one embodiment, the Phy may be directly configured by a user to connect in a straight or crossover configuration, thereby skipping the automatic detection and configuration of the Phy. Therefore, if a user is already aware of the connected devices, and the cables used, they may directly program the Phy as a Target or Host Phy.

Figure 3A:
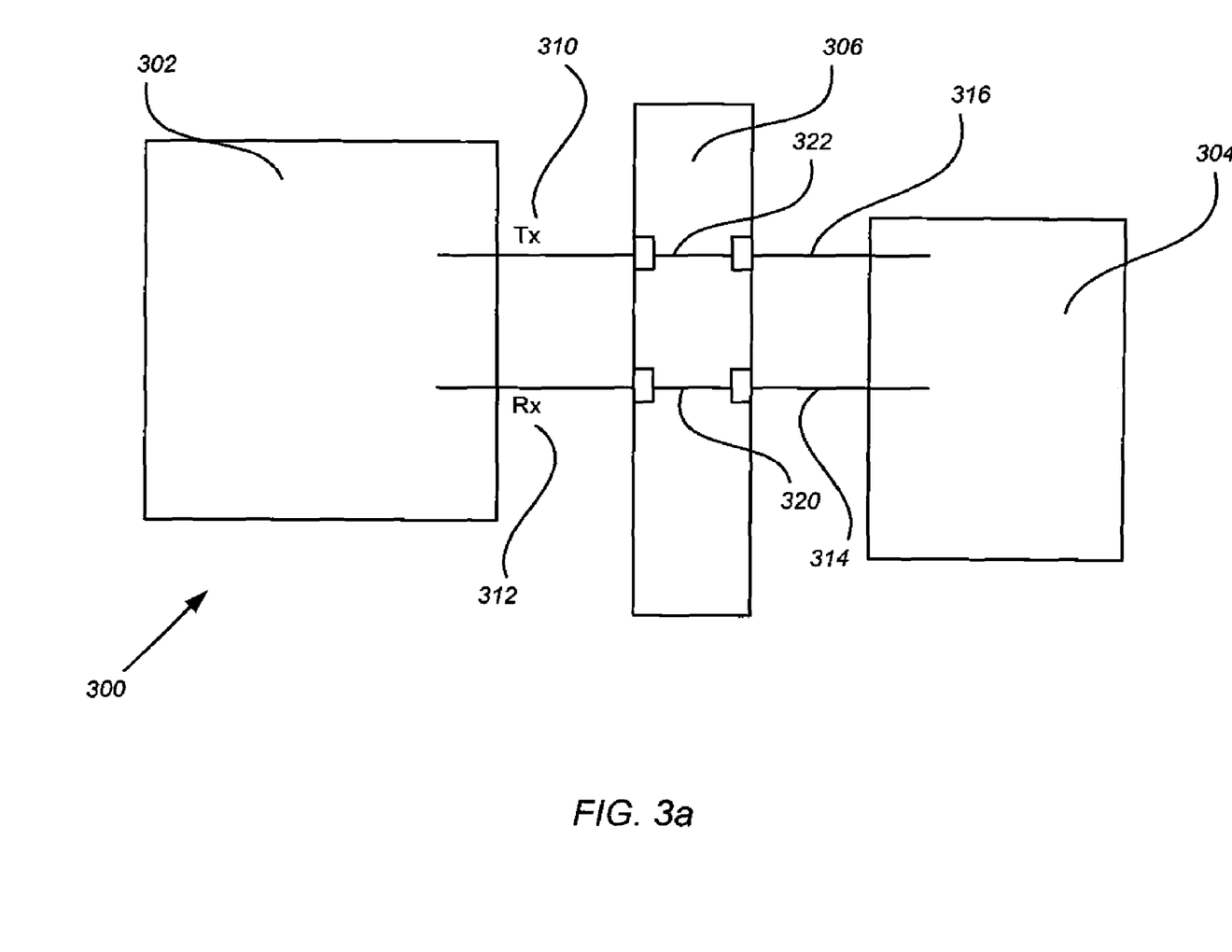
FIG. 3A illustrates a black box representative connection of the system in the Regular Host PHY Idle Mode.
Figure 3B:
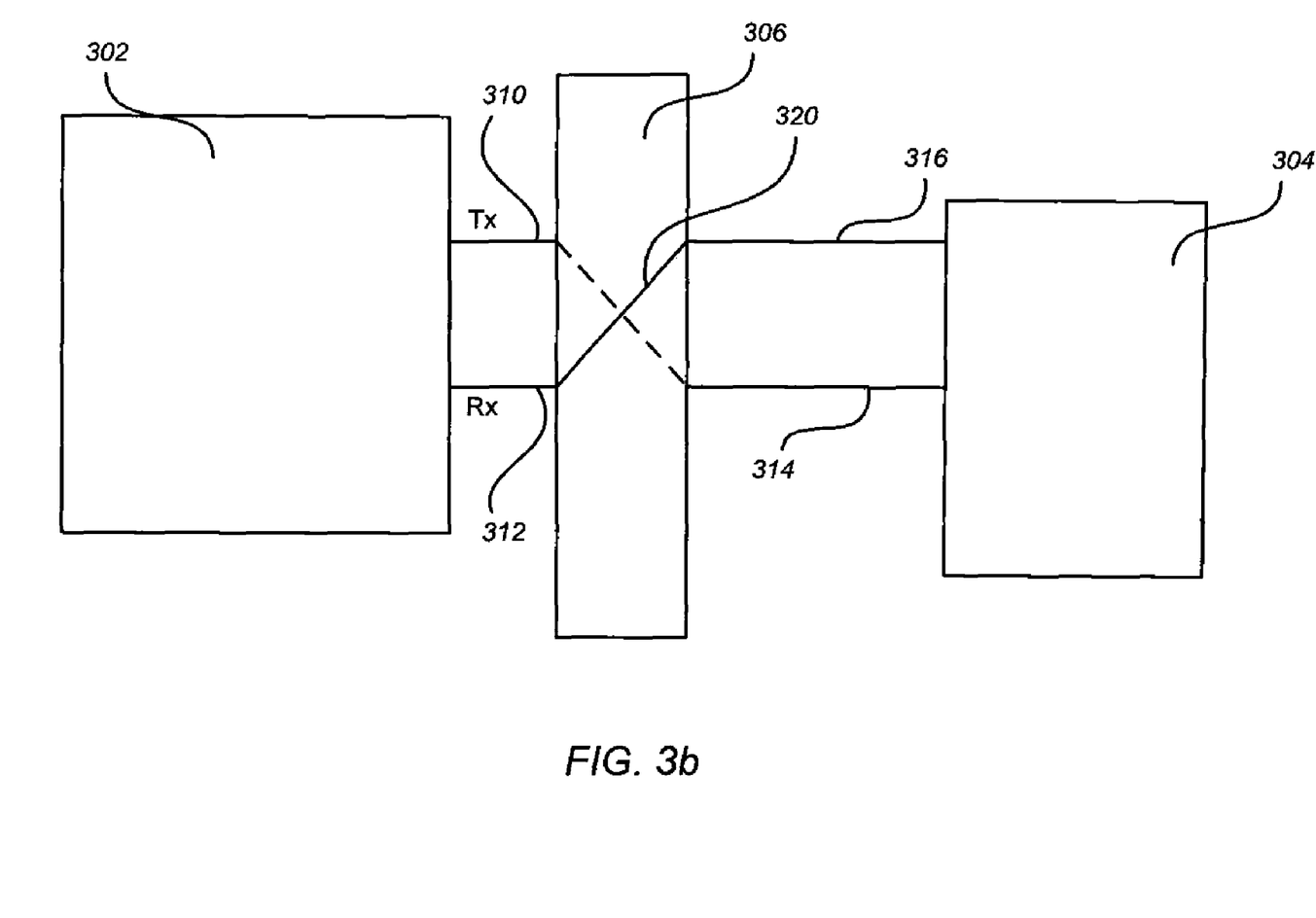
FIG. 3B illustrates a black box representative connection of the system in the Passive Crossover Listen Mode.

FIGS. 3A and 3B illustrates an exemplary black box detection and configuration scheme according to some embodiments of the present invention within a system 300. FIGS. 3A and 3B is represents the logic of FIG. 2 with a representation of the transmit and receive configurations found in a system 300. This figure is an oversimplification of the connection between devices within a Storage Area Network (SAN). FIG. 3 is not intended to represent the actual physical connection occurring within the system.

A Host device 302 is connected to another device 304 through the detection and connection black box 306. The Host 302 has a Phy with a transmit 310 and receive 312 lines. The other device 304 also has transmit and receive lines, 314 and 316. Generally, the other device 304 and the Host 302 must be hardwired to line up the transmit pin 310 of the Host 302 port to the receive line of the other device 304. Therefore, if the other device 304 changes configuration (the receive and transmit pins are on different sides of the port) by, for example, inserting a new device into the system then the hardwire of the host 302 would have to change accordingly, or a crossover cable would have to be installed.

Alternatively, a host device 302 may be connected to an unknown attached device 304. The unknown device 304 may be configured as a Host or Target device. If the unknown device 304 is a Target device then the connection to the Host 302 will be proper with a straight connection. However, if the unknown device 304 is another Host device such as an Expander, then a crossover connection is required to properly align the transmit and receive lines of the two devices. The Host device 302 has a transmit 310 and receive 312 line. The unknown device 304 also has a transmit and receive line. Since the device is unknown, the pins 314 and 316 could be either transmit or receive lines.

Embodiments of the current invention permits the Host 302 to properly connect to the other device 304 without violating SAS or SATA protocols, even if the device 304 is a replacement device not configured in the same way as a previous device, or if the configuration of the attached device 304 is unknown.

FIG. 3A illustrates a representative connection of the system in the Regular Host PHY Idle Mode. The system starts in the Regular Host PHY Idle Mode, which is the regular straight connection compliant with SAS or SATA protocol. The receive pin 312 of the Host 302 is connected straight across to the unknown line 314 of the other device 304, and the transmit pin 310 of the Host 302 is connected straight across to the unknown line 316 of the other device 304. The Host 302 then detects an OOB signal from the unknown device, and the system 300 continues with the specification algorithm. The pins, as aligned, are locked and no further switching occurs.

FIG. 3B illustrates the connection of the system in the Passive Crossover Listen Mode. If a signal is not detected while in Regular Host PHY Idle Mode, the system assumes that the pins are aligned backwards. The system then enters the Passive Crossover Listen Mode. Therefore the receive pin 312 is connected to the other line 316 of the unknown device 304. The transmit signal out of the transmit pin 310 from the Host device 302 is also turned off. If the system was hooked up backwards, then the transmit signal of the Host 302 was sent on the transmit pin of the unknown device 304. To prevent damage to the system, the transmit signal of the Host 302 is turned off while in the Passive Crossover Listen Mode. The system then listens again for a signal. If it is received then the system is properly configured in a crossover mode. The transmit signal of the Host is permitted to output to the pin 310 of the Host 302. The system then continues with the specification algorithm. The system acts as if the Host to Host connection was implemented with a traditional crossover cable and the system continues with the SAS or SATA insertion algorithms to set the connection speed and other connection parameters, and normal data transfer continues.

When the system is in Passive Crossover Listen Mode, the Host device 302 is not transmitting a signal to the other device 304. This may be accomplished by disconnecting the line between the two devices at the pins themselves, 310 to 314. In another embodiment, the connection may be made in the crossover mode between the transmit pin 310 of the Host 302 to the crossover pin 314 of the unknown device 304, but the signal out of the Host device 302 is turned off.

However, if no signal is received again, then the system returns to the original state, reconnecting the system in the Regular Host PHY Idle Mode. The system continues to switch between the regular and crossover modes until a signal is received. The time elapse to listen for a signal (switch rate) may be programmed by the user or may be preset into the logic.

The connection representations of FIGS. 3A and 3B are only illustrative of the result of the logic process and are an oversimplification of the switching hardware present to accomplish the actual connections. FIG. 3 depicts the straight and crossover switching connection 306 outside of the Host 302 and Unknown 304 devices; however, the connection may occur anywhere in the system. For example, the switching circuitry and logic may be incorporated directly into a device so that each Phy may be configured as a Target or Host. The logic and switching circuitry may be housed directly into the ASIC of a SAS expander.

Figure 4:
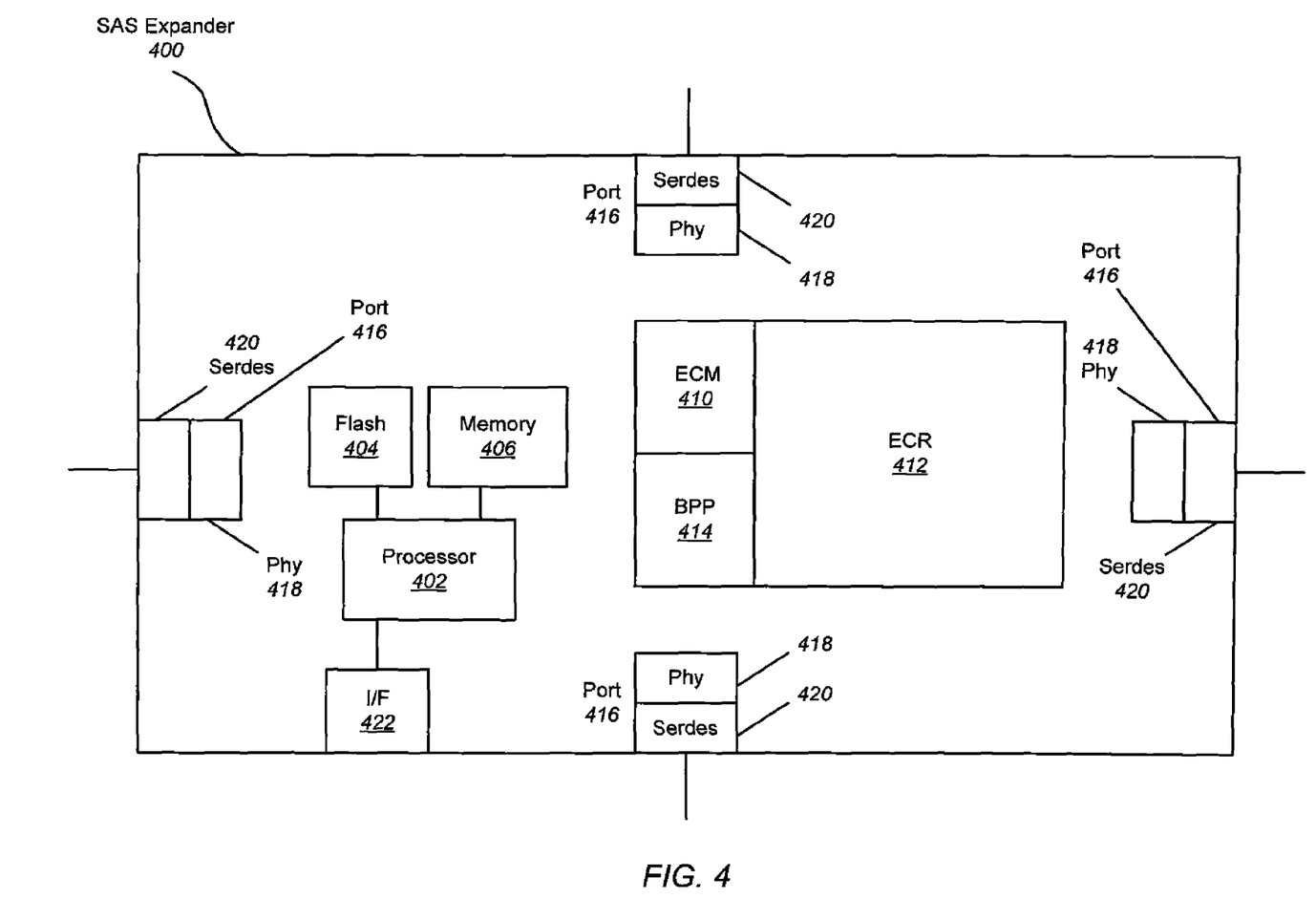
FIG. 4 illustrates an exemplary SAS expander employing the automatic detection and connection attributes according to embodiments of the invention.
Figure 5:
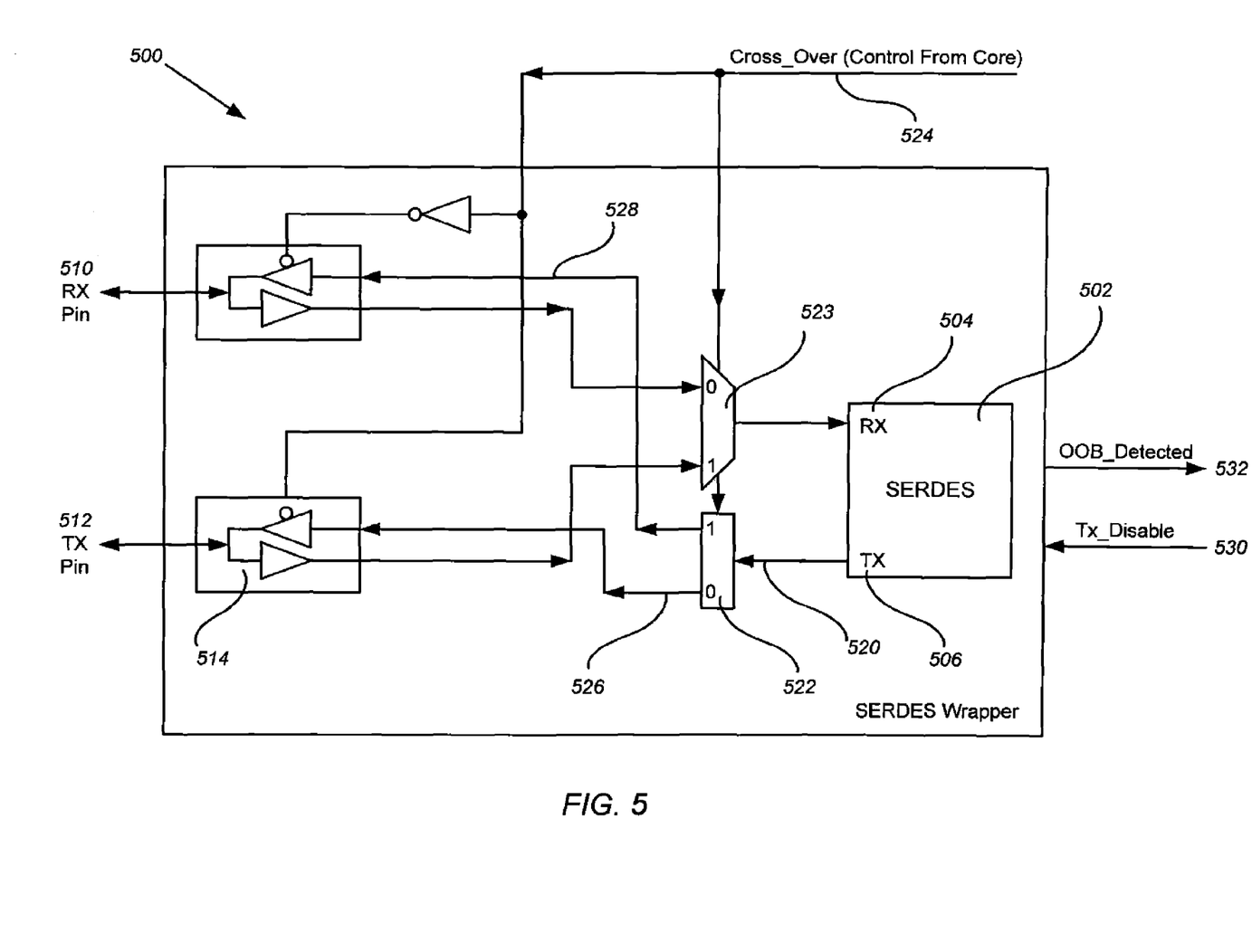
FIG. 5 illustrates one embodiment of the circuitry to employ the automatic detection and connection attributes according to embodiments of the invention.

FIG. 4 illustrates an exemplary SAS expander 400 employing the automatic detection and connection attributes according to embodiments of the invention. SAS expander 400 is shown with processor 402, flash 404, memory 406, and switch complex 408 including an expander connection manager (ECM) 410, expander connection router (ECR) 412, and broadcast primitive processor (BPP) 414. ECM 410 allows pathways to be built between two Phy. ECR 412 can include a crossbar switch, and makes and implements decisions regarding routing connections between Phy. BPP 414 propagates BCNs to all other ports in the SAS expander except the port that caused the BCN to be generated. SAS expander 400 also includes a plurality of ports 416, each including a Phy 418 and a serializer/deserializer (SERDES) 420, and an interface 422 for external out-of-band communications such as configuration commands from an administrator. The SERDES 420 may include the circuitry and controls for the automatic detection and connection as shown in FIG. 5. It should be understood that all SAS expanders shown herein have four ports for simplicity, but that in other embodiments many more ports may be present. The SAS expander 400 may be fabricated as its own Application Specific Integrated Circuit (ASIC), including all of the above components or any combination of components needed by an end user. The ASIC may then be incorporated onto a Storage Bay Bridge (SBB), which connects the Phy of the expander to physical ports to insert into enclosures, such as for a blade server.

Firmware residing in memory 406 or flash 404, which are forms of computer-readable media, can be executed by processor 404 to perform the operations described above with regard to the detection and connection attributes. Furthermore, memory 406 or flash 404 can store the configuration information as described above.

Note that this firmware can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples of the computer-readable medium include, but are not limited to, an electrical connection (electronic) having one or more wires, a portable computer diskette (magnetic), a random access memory (RAM) (magnetic), a read-only memory (ROM) (magnetic), an erasable programmable read-only memory (EPROM) (magnetic), an optical fiber (optical), portable optical disc such a CD, CD-R, CD-RW, DVD, DVD-R, or DVD-RW, or flash memory such as compact flash cards, secured digital cards, USB memory devices, a memory stick, and the like. Note that the computer-readable medium could even be paper or another suitable medium upon which the program is printed, as the program text can be electronically captured via optical scanning of the paper or other medium, then compiled, interpreted or otherwise processed in a suitable manner if necessary, and then stored in a computer memory.

FIG. 5 illustrates an exemplary circuit to perform the detection and connection algorithm, In order to perform the crossover mode, the traditional TX output pad (OUTPAD type) and the RX input pad (INPAD type) are changed into bidirectional pads (BIDIR type) so that each TX and RX pin can be used for a transmit or receive signal.

FIG. 5, as an example, is one embodiment of the invention that permits the receive input 504 and transmit output 506 of a SERDES 502 to connect to either pin 510 or 512 of an expander. In one embodiment of the present invention, the SERDES wrapper 500 may be included within the ASIC design or may be separate. A conventional SERDES 502 has a receive 504 and transmit 506 signal that are unidirectional. Therefore, the receive line cannot also transmit a signal. In order to permit the external pins 510 and 512 to become bidirectional, cross over circuitry is added. Taking the transmit signal 506 out of the SERDES 502, the signal leaves the SERDES on a unidirectional output line 520. This signal enters a demultiplexer 522 (a multiplexer 523 on the receive side 504). The demultiplexer 522 receives a select signal 524 to control whether the connection is in a normal or crossover mode. The select signal 524 is controlled by the switching logic within the ASIC. For example, when the select signal 524 is low (for this example), then the pins are connected in a straight configuration and the transmit signal 506 out from the SERDES 502 is connected to the transmit pin 512. The signal exits the demultiplexer 522 on line 526 that connects to the transmit pin 512. If, however, the select signal 524 is high, then connection is in crossover mode, where the transmit signal 506 of the SERDES is transmitting out of the normal receive pin 510 through the connecting trace 528. Each bi-directional pad 514 includes a tri-state output buffer on each trace to ensure that when a signal is received on either pin it is not transmitted to the transmit output 506 of the SERDES.

During the Regular Host PHY Idle Mode, the receive pin 510 is connected to the receive signal input 504 of the SERDES 502. A signal may enter on the receive pin 510 through the bi-directional pad 514. The signal control 524 from the ASIC selects the proper channel on the multiplexer 523 (low or zero signal for the multiplexer shown as an example) so the proper line from the receive pin is chosen. The same select signal (zero in the example) also connects the transmit signal 506 from the SERDES 502 to the transmit pin 512 through the appropriate line 526.

In the Passive Crossover Listen Mode, the selection control 524 is switched so the multiplexer 523 changes to permit the other channel from the transmit pin 512 to pass to the receive 504 side of the SERDES 502. To prevent the SERDES transmit signal from being sent to the receive pin 510 during the Passive Crossover Listen Mode, the connection between the signal 506 to the pin 510 may be broken, or the SERDES 502 itself may be controlled to not transmit a signal. For example, the demultiplexer 522 may include a third state (not shown), controlled by signal 524, to break the connection between the transmit signal 506 and either pin 510 or 512. In an alternative example, there may be a second control line, Tx_disable 530, from the ASIC logic controller into the SERDES to prevent the transmit signal 506 from being sent.

A separate detection line, OOB_detect 532, also comes out of the SERDES. In either the Regular Host PHY Idle Mode, or the Passive Crossover Listen Mode, the SERDES sends the detected OOB signal to the switching logic controller of the ASIC. The logic controller of the ASIC (not shown) then determines the appropriate step depending on whether a signal is received or not. If a signal is detected, the ASIC proceeds with the insertion algorithm. If a signal is not detected, then the logic controller sends the appropriate signals on lines 524 and 530 to change the mode of the port configuration.

Figure 6:
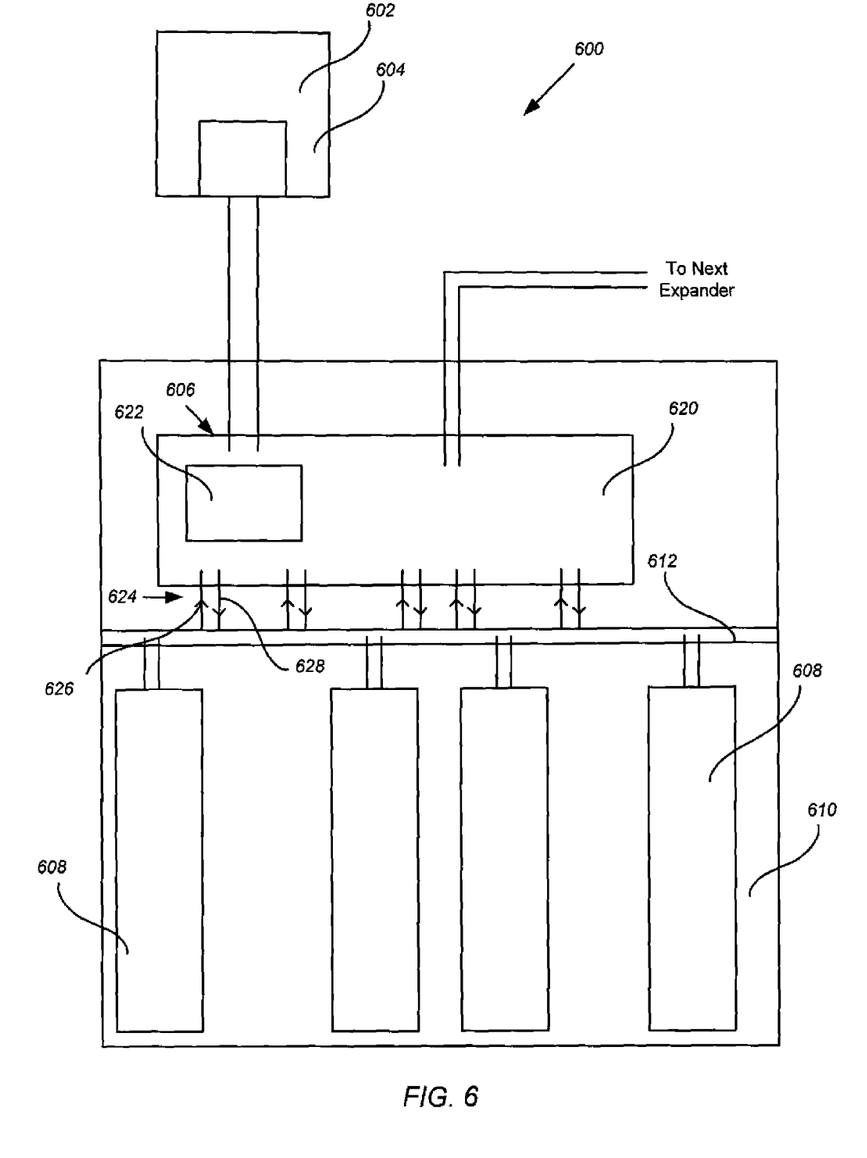
FIG. 6 illustrates one embodiment of the connections of a Storage Area Network (SAN) employing the automatic detection and connection attributes ac cording to embodiments of the invention.

FIG. 6 illustrates one embodiment of the connections of a SAN. The SAN system 600 interconnects different kinds of data storage devices. In the illustration of FIG. 6, a Host 602, including a Host Bus Adaptor (HBA) 604, is connected to a cascade of SAS expanders 606. Attached to each SAS expander may be one or more SAS or SATA drives 608. Each drive is housed in an enclosure 610 and connected to a midplane or chassis 612 within the enclosure. A Storage Bay Bridge (SBB) 620 houses the control logic and circuitry for the auto detection and connection 622 of the various ports 624 of the SBB. Each port 624 has a receive 626 and a transmit 628 pin. Each port of the SBB is connected to the Phy of the expander by traces on the SBB board (not shown). Whenever an expander or new drive is inserted into the system, or if one of the devices is disconnected and changed for a new device, the auto detection and connection logic connects the ports according to the embodiments of this invention.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A method for automatically configuring a Serial Attached SCSI (SAS) compliant device to properly receive and transmit signals to a connected device, comprising:
   detecting a first OOB signal transmitted from the connected device on a receive pin of the SAS compliant device;
   entering into a first crossover mode in which the receive pin of the SAS compliant device is switched to a different pin of the connected device if the first OOB signal transmitted from the connected device is not detected;
   turning off a transmit signal of the SAS compliant device when the internal connections are switched;
   listening for a second OOB signal transmitted from the connected device after switching during the first crossover mode; and
   entering into a second crossover mode if the second OOB signal is detected at the receive pin of the SAS compliant device.

2. The method of claim 1, wherein the first and second OOB signals detected are a SATA OOB signal from the connected device.

3. The method of claim 1, wherein the first and second OOB signals detected are a SAS OOB signal from the connected device.

4. The method of claim 1, further comprising configuring the SAS compliant device in a Regular Host PHY Mode.

5. The method of claim 1, further comprising specifying a time lapse between detecting the signal and entering into the first or second mode.

6. The method of claim 1, further comprising specifying a starting connection configuration.

7. The method of claim 6, wherein the starting connection configuration is either a straight connection or a crossover connection.

8. The method of claim 6, further comprising bypassing entering into the first or second mode.

9. The method of claim 1, further comprising starting regular system operations after entering the second crossover mode.

10. The method of claim 1, further comprising starting regular system operations if the first OOB signal transmitted from the connected device is detected.

11. The method of claim 1, further comprising switching the receive pin of the SAS compliant device to a straight configuration if the second OOB signal is not detected at the receive pin of the SAS compliant device.

12. The method of claim 11, further comprising repeating the steps of claim 1 after switching the receive pin of the SAS compliant device to the straight configuration.

13. A Serial Attached SCSI (SAS) expander for automatically configuring a port to properly receive and transmit signals to a connected device, comprising:
   a plurality of ports; and
   a processor communicatively coupled for configuring the plurality of ports and programmed for
      detecting a first OOB signal transmitted from the connected device on a receive pin of the SAS compliant device;
      entering into a first crossover mode in which the receive pin of the SAS compliant device is switched to a different pin of the connected device if the first OOB signal transmitted from the connected device is not detected;

turning off a transmit signal of the SAS compliant device when the internal connections are switched;

listening for a second OOB signal transmitted from the connected device after switching during the first crossover mode; and entering into a second crossover mode if the second OOB signal is detected at the receive pin of the SAS compliant device.

14. The SAS expander of claim 13, further comprising:
a plurality of physical layers (Phys); and
wherein at least one physical layer (Phy) further comprises
a first pin and a second pin for receiving and transmitting an input signal and an output signal,
a multiplexer to control a first connection between the input and the first pin and the second pin, and
a demultiplexer to control a second connection between the output and the first pin and the second pin.

15. The SAS expander of claim 14, further comprising a first bi-directional pad connected to the first pin, and a second bi-directional pad connected to the second pin.

16. The SAS expander of claim 14, further comprising a serializer/deserializer (SERDES) to transmit the output signal and receive the input signal.

17. The SAS expander of claim 13, wherein the first and second OOB signals detected are a SATA OOB signal from the connected device.

18. The SAS expander of claim 13, wherein the first and second OOB signals detected are a SAS OOB signal from the connected device.

19. The SAS expander of claim 13, the processor further programmed for specifying a time lapse between detecting the signal and entering into the first or second mode.

20. The SAS expander of claim 13, the processor further programmed for specifying a starting connection configuration.

21. A Storage Area Network including the SAS expander of claim 13.

22. A Storage Bay Bridge including the SAS Expander of claim 13.

23. The SAS expander of claim 13, the processor further programmed for starting regular system operations after entering the second crossover mode.

24. The SAS expander of claim 13, the processor further programmed for starting regular system operations if the first OOB signal transmitted from the connected device is detected.

25. The SAS expander of claim 13, the processor further programmed for switching the receive pin of the SAS compliant device to a straight configuration if the second OOB signal is not detected at the receive pin of the SAS compliant device.

26. The SAS expander of claim 13, the processor further programmed for repeating the steps of claim 13 after switching the receive pin of the SAS compliant device to the straight configuration.

27. A non-transitory computer-readable storage medium comprising program code for enabling port configurations in Serial Attached SCSI (SAS) expander networks, the program code for causing performance of a method comprising:

detecting a first OOB signal transmitted from the connected device on a receive pin of the SAS compliant device;

entering into a first crossover mode in which the receive pin of the SAS compliant device is switched to a different pin of the connected device if the first OOB signal transmitted from the connected device is not detected;

turning off a transmit signal of the SAS compliant device when the internal connections are switched;

listening for a second OOB signal transmitted from the connected device after switching during the first crossover mode; and entering into a second crossover mode if the second OOB signal is detected at the receive pin of the SAS compliant device.

28. The non-transitory computer-readable storage medium of claim 27, wherein the first and second OOB signals detected are a SAS OOB signal from the connected device.

29. The non-transitory computer-readable storage medium of claim 27, wherein the first and second OOB signals detected are a SATA OOB signal from the connected device.

30. The non-transitory computer-readable storage medium of claim 27, wherein the method further comprises starting regular system operations after entering the second crossover mode.

31. The non-transitory computer-readable storage medium of claim 27, wherein the method further comprises starting regular system operations if the first OOB signal transmitted from the connected device is detected.

32. The non-transitory computer-readable storage medium of claim 27, wherein the method further comprises switching the receive pin of the SAS compliant device to a straight configuration if the second OOB signal is not detected at the receive pin of the SAS compliant device.

33. The non-transitory computer-readable storage medium of claim 32, wherein the method further comprises repeating the steps of claim 27 after switching the receive pin of the SAS compliant device to the straight configuration.

* * * * *